(12) United States Patent
de Magalhães Gomes

(10) Patent No.: US 12,071,219 B2
(45) Date of Patent: Aug. 27, 2024

(54) PROPELLER GOVERNOR FOR ELECTRIC SYNCHRONOUS THRUST

(71) Applicant: EMBRAER S.A., São José dos Campos-SP (BR)

(72) Inventor: Ierko de Magalhães Gomes, São José dos Campos-SP (BR)

(73) Assignee: Embraer S.A., São José dos Campos-SP (BR)

( * ) Notice: Subject to any disclaimer, the term of this patent is extended or adjusted under 35 U.S.C. 154(b) by 133 days.

(21) Appl. No.: 17/184,115

(22) Filed: Feb. 24, 2021

(65) Prior Publication Data

US 2021/0276693 A1 Sep. 9, 2021

Related U.S. Application Data

(60) Provisional application No. 62/984,444, filed on Mar. 3, 2020.

(51) Int. Cl.
| | | |
|---|---|---|
| B64C 11/44 | (2006.01) | |
| F01D 7/00 | (2006.01) | |
| F01D 17/24 | (2006.01) | |
| F02C 6/20 | (2006.01) | |

(52) U.S. Cl.
CPC ............... B64C 11/44 (2013.01); F01D 7/00 (2013.01); F01D 17/24 (2013.01); F02C 6/206 (2013.01); *F05D 2220/323* (2013.01)

(58) Field of Classification Search
CPC . H02P 5/50; B64C 11/44; B64C 11/50; B60L 2240/423; B60L 2240/427; B60L 2240/429; B02P 21/22
See application file for complete search history.

(56) References Cited

U.S. PATENT DOCUMENTS

| | | | | |
|---|---|---|---|---|
| 2,118,654 A | * | 5/1938 | Meijer ................... | B64C 11/34 60/529 |
| 2,246,516 A | * | 6/1941 | Herzog .................. | H02P 23/16 361/243 |
| 2,302,042 A | * | 11/1942 | Erle ......................... | H02P 5/50 416/34 |
| 2,408,451 A | * | 10/1946 | Sorensen ................. | H02P 5/50 416/34 |
| 2,612,956 A | * | 10/1952 | Banning, Jr. ............ | H02P 5/48 416/34 |

(Continued)

FOREIGN PATENT DOCUMENTS

| | | |
|---|---|---|
| CA | 2556938 A1 | 9/2005 |
| GB | 922255 A | 3/1963 |

(Continued)

OTHER PUBLICATIONS

Cutler, "How A Constant Speed Propeller Works", boldmethod, Dec. 19, 2017, https://www.boldmethod.com/learn-to-fly/aircraft-systems/how-a-constant-speed-prop-works/.

(Continued)

*Primary Examiner* — Justin D Seabe
(74) *Attorney, Agent, or Firm* — Nixon & Vanderhye P.C.

(57) ABSTRACT

A thrust propeller variable pitch actuator is controlled by a governor that uses propeller pitch as a variable to increase or decrease torque—not to maintain the propeller speed or RPM but instead to maintain certain established electric current supplied to rotate the thrust propeller.

16 Claims, 2 Drawing Sheets

(56) References Cited

U.S. PATENT DOCUMENTS

| | | | | |
|---|---|---|---|---|
| 2,715,206 | A | * | 8/1955 | Light .................. H02P 5/50 416/34 |
| 2,731,094 | A | * | 1/1956 | Hine ................ B64C 11/325 416/34 |
| 2,761,518 | A | * | 9/1956 | Treseder ............ B64C 11/44 416/49 |
| 3,066,741 | A | * | 12/1962 | Barnes .............. B64C 11/50 416/34 |
| 3,070,174 | A | | 12/1962 | Toulmin, Jr. |
| 3,589,830 | A | * | 6/1971 | Mogren ............ B63H 25/46 416/1 |
| 3,589,832 | A | * | 6/1971 | Harris ................ B64C 11/50 416/34 |
| 4,661,714 | A | * | 4/1987 | Satterthwaite ...... B60L 50/13 318/67 |
| 5,281,095 | A | * | 1/1994 | Komura ............ B64C 11/30 416/158 |
| 9,376,213 | B2 | | 6/2016 | Rolt |
| 2016/0340051 | A1 | | 11/2016 | Edwards et al. |
| 2018/0118356 | A1 | | 5/2018 | Armstrong et al. |
| 2019/0193835 | A1 | | 6/2019 | Sandberg et al. |

FOREIGN PATENT DOCUMENTS

| | | | |
|---|---|---|---|
| JP | H08216993 | * | 8/1996 |
| WO | 2017123699 A1 | | 7/2017 |
| WO | WO-2020240567 A1 | * | 12/2020 |

OTHER PUBLICATIONS

International Search Report issued in PCT/BR2021/050090 dated Jun. 7, 2021.

Extended European Search Report issued in Application No. 21763720.6 dated Mar. 5, 2024.

* cited by examiner

PROPELLER GOVERNOR FOR ELECTRIC SYNCHRONOUS THRUST

CROSS-REFERENCE TO RELATED APPLICATIONS

The present application claims benefit of 62/984,444 filed Mar. 3, 2020, which is incorporated herein by reference in its entirety and for all purposes.

FIELD

The technology herein relates to control systems for hybrid power derivation by a synchronous triphasic (triphase) or polyphasic (polyphase) wiring from a thermal machine for an electric machine.

BACKGROUND & SUMMARY

The regular governor of an airplane propeller has the function of maintaining a set propeller speed. It uses propeller pitch as a variable to increase or decrease torque the propeller applies to the air in order to maintain the established or desired rotation speed (revolutions per minute, or RPM) of the propeller. The governor typically changes the propeller's blade pitch hydraulically. A flight deck control or fly-by-wire mechanism can be used to change propeller blade pitch. As the blade angle is increased, the propeller produces more thrust (lift in the case of a helicopter or certain other kinds of propellers). At the same time, more torque is required to spin the propeller in the air, and the engine slows down. The opposite is true when the blade angle is decreased: the torque required to spin the propeller decreases, and the engine speeds up. See e.g., https://www.boldmethod.com/learn-to-fly/aircraft-systems/how-a-constant-speed-prop-works/incorporated herein by reference.

The conventional propeller governor thus has the function of keeping the RPM commanded. It uses the propeller pitch as a variable to add or reduce torque so that the established RPM is maintained. Otherwise, all known electrical aviation uses brushless motors with an inverter (asynchronous system).

DETAILED DESCRIPTION OF NON-LIMITING EMBODIMENTS

The technology herein provides a totally new installation, where the governor of an airplane propeller uses propeller pitch as a variable to increase or decrease torque, not to maintain the RPM, but to maintain certain established electric current.

Generally speaking, considering a synchronous electric transmission system between two mechanical systems, the adjustment of the torque demand must be controlled. In such a case, the mechanical system which demands energy would be a thrust propeller with adjustable pitch, powered by a synchronous (e.g., brushless) electric motor. The mechanical system which provides electric energy would consist of a thermal engine with an alternator, that might have other torque demands or not (e.g., imposed by a further propeller).

In synchronous electric traction, the speed of rotation is controlled by the frequency of the alternator. The technical problem is how to control the torque of the synchronous electric motor, which regulates the power demand, so that the transmission is within control, supply and capacity limits.

In one embodiment herein, this control would have the following concept: The torque the electric motor must apply to turn the propeller is proportional to the electric current. Therefore, the electric current would be the input variable. The demanded torque may be adjusted by the propeller pitch, that would be output variable. Thus, propeller pitch is controlled as a function of electric current. The current adjustment is associated with the power command and the governor will look for the propeller pitch, which will demand the desired current.

Figure 1:
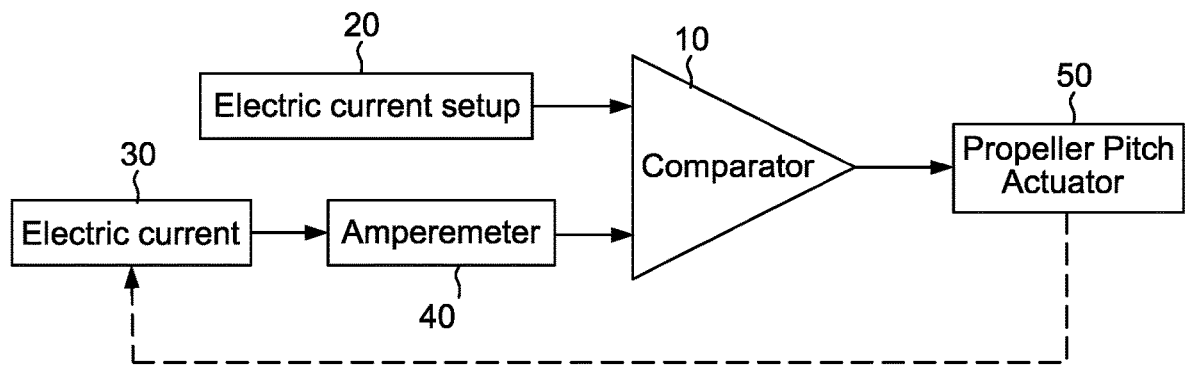
FIG. 1 shows an example non-limiting block diagram.

FIG. 1 is a schematic block diagram of one embodiment. In this embodiment, a propeller pitch actuator 50 (which may be hydraulic, magnetic, etc.) controls the pitch of the blades of a propeller. The actuator 50 controls this pitch based on the output of a comparator 10. The comparator 10 generates this pitch control output in response to comparing an amount (amplitude) of electric current 30 produced in response to the rotating propeller blades (as measured by an amperemeter or current meter 40) to a predetermined or set value ("electric current setup") 20. This circuit thus regulates, using closed loop feedback control of the propeller blade pitch, the amount of current consumed to rotate the propeller by varying the torque required to rotate the propeller blades such that the current is constant.

Figure 3:
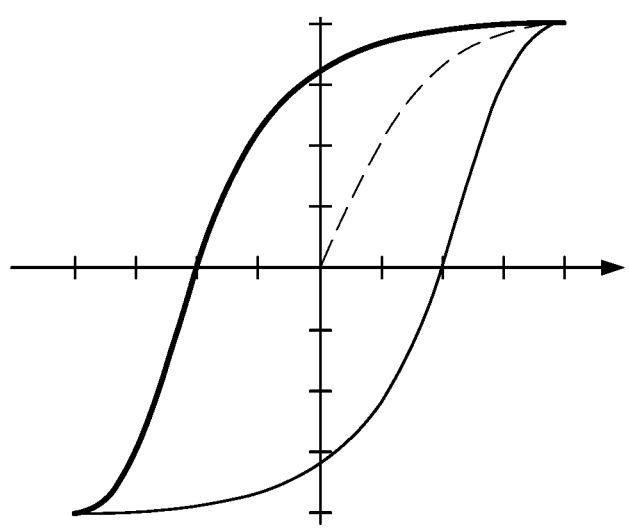
FIG. 3 shows an example non-limiting hysteresis diagram.

In one embodiment, the comparator 10 provides a degree or amount of hysteresis to provide stability and prevent the system from attempting to make minute or oscillating adjustments to propeller pitch. See FIG. 3 showing an example hysteresis curve providing two different thresholds to prevent the variable pitch output from bunting around the set point.

Figure 2:
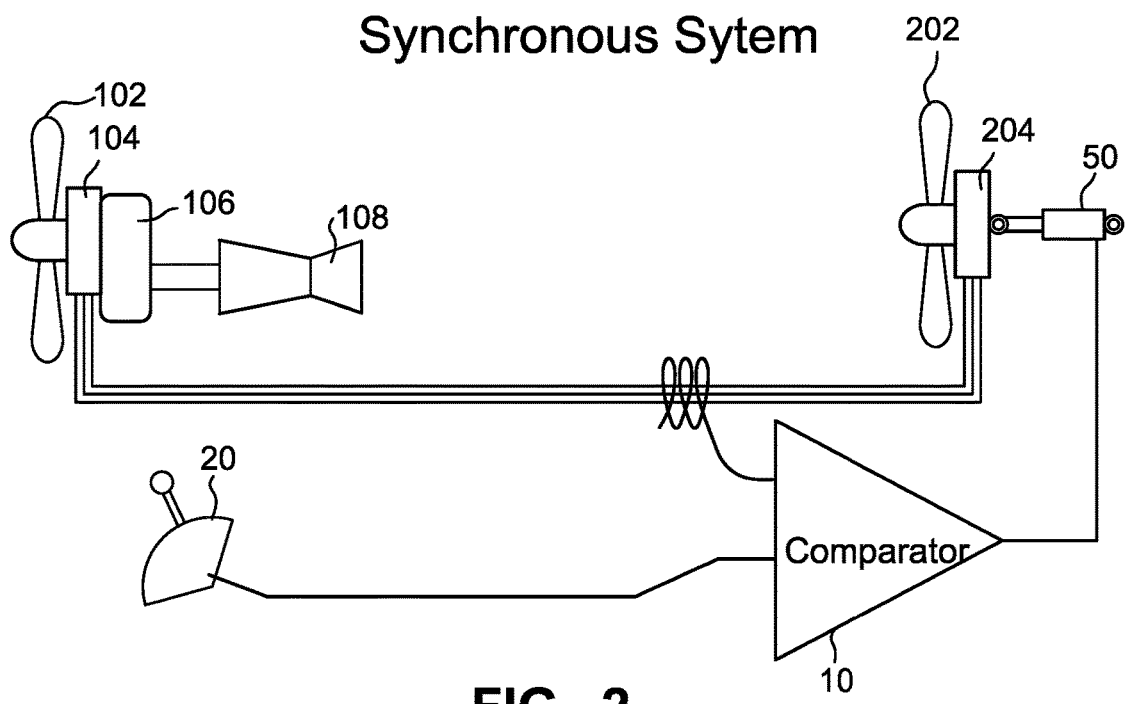
FIG. 2 shows an example non-limiting system diagram.

In one embodiment shown in FIG. 2, the electric current setup is associated to the airplane power command (thrust lever operated by the pilot) and the governor will find the propeller pitch which demands or produces that desired setup electric current. This process works in a closed loop iteration (feedback loop), adjusting pitch to make consequent electric current fit with setup.

In more detail, FIG. 2 shows a mechanical system which demands energy comprising a thrust propeller 202 with adjustable pitch adjusted by pitch actuator 50, powered by a synchronous (e.g., brushless) electric motor 204. The shaft of electric motor 204 in this embodiment rotates in synchronism with the frequency of a multiphase alternating electrical current (AC). In this embodiment, the multiphase AC supply current is supplied by an alternator 104 that is coupled between a thermal engine 108 (e.g., a gas turbine, internal combustion or other conventional thermal engine) and a second (e.g., main) propeller 102. For example, propeller 102 may be a main propulsion propeller for an aircraft, and thrust propeller 202 may be an auxiliary or additional propeller such as one that receives thrust air from under a wing. In one embodiment, thermal engine 108 is coupled through a gearbox 108 to a shaft on which both the alternator 104 and the propeller 102 are mounted.

As mentioned above, the mechanical system which provide electric energy would consist of thermal engine 108 with alternator 104, that might have other torque demands or not. For example, the presence of propeller 102 is not required for alternator 104 to produce electric power, and propeller 102 if present may be a fixed or variable pitch propeller.

In one embodiment, alternator 104 produces a multiphase (e.g., three phase or polyphase) AC output having an alternating current frequency that is dependent on the rotational speed of the output shaft of gearbox 108. This gearbox 108 output shaft rotational speed thus determines the speed at which synchronous motor 204 rotates and thus the speed at which propeller 202 rotates.

In one embodiment, a magnetic field (non-contact) amperemeter (current meter) 40 current sensor is used to monitor the multiphase AC output of alternator 104. In one example, meter 40 monitors the magnitude of the electric current produced by alternator 104 that electric motor 204 draws or consumes. In one embodiment, the amperemeter 40 comprises a sensing coil that produces a voltage proportional to the amount of current the synchronous electric motor 204 draws from the alternator 104, Such current magnitude can be measured/sensed using Faraday's Law of induction. In one example embodiment, the amperemeter 40 includes a rectifier and filter (e.g., RC network) of appropriate design to provide a smoothed DC voltage level that is proportional to the amount of current electric motor 204 draws from alternator 104.

In one embodiment, this sensed voltage is compared to a voltage set point. In particular, the measured/sensed current magnitude is applied to one input of comparator 10. The other input of comparator 10 is provided by a set point controlled by a pilot-controlled airplane power command (thrust lever) 10 used to control the amount of thrust the thrust propeller 202 produces. In this way, the blade pitch of thrust propeller 202 (and thus the amount of torque the motor must supply to rotate the propeller) is varied based on a comparison between a pilot-controlled thrust lever set point and an amount of current being consumed or drawn by a synchronous electric motor used to rotate the thrust propeller, in order to provide a new kind of governor that uses propeller 202 pitch as a variable to increase or decrease torque—not to maintain the propeller 202 RPM, but to maintain certain established electric current (e.g., constant or set or predetermined electric current draw by the synchronous motor).

The circuits shown in FIGS. 1 and 2 can be implemented in a variety of ways. One option is to use discrete circuitry such as an op amp based comparator 10. Another option is to use A/D converters to convert the various inputs into quantized digital signals that may then be compared using a microprocessor or digital signal processor. A still further option is to provide an ASIC that provides an integrated circuit that is configured to perform the comparison shown.

The present non-limiting technology herein thus has an advantage of enabling use of a synchronous energy transmission system. The synchronous system does not require rectifiers and inverters in the power line as used in typical asynchronous systems. Therefore, the synchronous system presents lower cost, less weight, greater efficiency and lesser vulnerabilities in relation to the asynchronous system. In addition, the asynchronous system does not dispense with the use of a conventional governor. However, the technology herein is not limited to synchronous systems, but could also be used with asynchronous systems including induction motors rather than synchronous motors.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An aircraft control system for use with a variable pitch propeller rotated by an electric motor supplied by a polyphase supply current, the aircraft control system comprising:
   an actuator that controls the variable pitch of the propeller;
   an electric circuit coupled to sense the current drawn by the electric motor and to control the pitch actuator in response to the sensed current drawn in order to vary the torque the electric motor applies to rotate the variable pitch propeller and thereby maintain the current at a set point without requiring maintenance of propeller rotation speed; and
   an alternator connected to a thermal engine such as a gas turbine engine, the alternator configured to generate the polyphase supply current and to supply the polyphase supply current to the electric motor,
   wherein the alternator is connected to the thermal engine through a gearbox, and the alternator produces an alternating current frequency that is dependent on the rotational speed of an output shaft of the gearbox, the gearbox output shaft rotational speed determining speed at which the electric motor rotates and thus the speed at which the propeller rotates.

2. The aircraft control system of claim 1 wherein the electric circuit includes a comparator that compares the sensed current to the set point.

3. The aircraft control system of claim 2 further including a pilot control that establishes the set point.

4. The aircraft control system of claim 3 wherein the pilot control comprises a thrust control.

5. The aircraft control system of claim 1 wherein the propeller rotates in response to the electric motor receiving the polyphase alternating current and synchronously rotates at a frequency of the polyphase alternating current frequency.

6. The aircraft control system of claim 1 wherein the electric circuit provides hysteresis.

7. The aircraft control system of claim 1 wherein the electric circuit provides closed loop feedback.

8. A control method for operating an aircraft of the type having a variable pitch propeller coupled to an electric motor supplied by a polyphase supply current, the control method comprising:
   rotating an alternator with a thermal engine;
   producing a polyphase alternating current with the alternator;
   the alternator supplying the polyphase alternating current as the polyphase supply current to the electric motor;
   sensing the supply current; and
   hydraulically controlling the variable pitch of the propeller in response to the sensed supply current to maintain the sensed supply current at a set point without maintaining propeller rotation speed,
   wherein the alternator is connected to the thermal engine through a gearbox, and the alternating current the alternator produces has a frequency that is dependent on rotational speed of an output shaft of the gearbox, the gearbox output shaft rotational speed determining speed at which the electric motor rotates and thus the speed at which the propeller rotates.

9. The control method of claim 8 wherein controlling includes comparing the sensed supply current with a set point.

10. The control method of claim 9 further including manually establishing the set point.

11. The control method of claim 10 wherein manually establishing the set point comprises operating a thrust control.

12. The control method of claim 8 wherein the electric motor is synchronous, and the method further includes rotating the propeller in response to the synchronous electric motor supplied by the polyphase alternating current.

13. The control method of claim 8 further including providing hysteresis.

14. The control method of claim 8 further including providing closed loop feedback.

15. An aircraft comprising:
- an alternator connected to a thermal engine such as a gas turbine engine, the alternator configured to generate a polyphase supply current and to supply the polyphase supply current to a synchronous electric motor;
- a variable pitch propeller rotated by the synchronous electric motor;
- a pitch actuator configured to control the variable pitch of the propeller;
- a current sensor connected to sense polyphase current drawn by the synchronous electric motor; and
- a controller operatively coupled to the current sensor and configured to control the pitch actuator in response to the sensed polyphase current drawn without requiring maintenance of propeller rotation speed,
- wherein the alternator is connected to the thermal engine through a gearbox, and the alternator produces an alternating current frequency that is dependent on the rotational speed of an output shaft of the gearbox, the gearbox output shaft rotational speed determining speed at which the synchronous motor rotates and thus the speed at which the propeller rotates.

16. The aircraft of claim 15 wherein the controller comprises a comparator that compares the sensed current drawn to a predetermined set point.

\* \* \* \* \*